(12) United States Patent
Foy, III et al.

(10) Patent No.: US 8,280,566 B2
(45) Date of Patent: Oct. 2, 2012

(54) METHOD, SYSTEM, AND COMPUTER SOFTWARE CODE FOR AUTOMATED ESTABLISHMENT OF A DISTRIBUTED POWER TRAIN

(75) Inventors: Robert James Foy, III, Melbourne, FL (US); James Glen Corry, Palm Bay, FL (US)

(73) Assignee: General Electric Company, Schenectady, NY (US)

( * ) Notice: Subject to any disclaimer, the term of this patent is extended or adjusted under 35 U.S.C. 154(b) by 1098 days.

(21) Appl. No.: 11/552,602

(22) Filed: Oct. 25, 2006

(65) Prior Publication Data
US 2007/0241237 A1 Oct. 18, 2007

Related U.S. Application Data

(60) Provisional application No. 60/792,428, filed on Apr. 17, 2006.

(51) Int. Cl.
*B61L 3/00* (2006.01)
(52) U.S. Cl. .......... 701/19; 701/20; 701/123; 246/167 R
(58) Field of Classification Search .............. 246/167 R; 701/19, 20, 123
See application file for complete search history.

(56) References Cited

U.S. PATENT DOCUMENTS

| | | | | |
|---|---|---|---|---|
| 4,793,047 A * | 12/1988 | Curtis et al. | ............... | 29/407.08 |
| 5,437,422 A * | 8/1995 | Newman | ............... | 246/5 |
| 5,487,516 A * | 1/1996 | Murata et al. | ............... | 246/182 C |
| 5,738,311 A * | 4/1998 | Fernandez | ............... | 246/168 |
| 5,817,934 A * | 10/1998 | Skantar | ............... | 73/121 |
| 5,950,967 A * | 9/1999 | Montgomery | ............ | 246/182 R |
| 6,680,918 B1 * | 1/2004 | Haley | ............... | 370/282 |
| 6,691,957 B2 * | 2/2004 | Hess et al. | ............... | 246/186 |
| 6,758,147 B2 * | 7/2004 | Howard et al. | ............... | 105/247 |
| 6,759,951 B2 * | 7/2004 | Kellner et al. | ............... | 340/438 |
| 6,837,550 B2 | 1/2005 | Dougherty et al. | | |
| 6,862,502 B2 * | 3/2005 | Peltz et al. | ............... | 701/19 |
| 6,922,619 B2 * | 7/2005 | Baig et al. | ............... | 701/20 |
| 6,937,925 B2 * | 8/2005 | Smith | ............... | 701/20 |
| 6,997,418 B1 * | 2/2006 | Sanzone | ............... | 246/167 R |
| 7,021,588 B2 * | 4/2006 | Hess et al. | ............... | 246/186 |
| 7,021,589 B2 * | 4/2006 | Hess et al. | ............... | 246/187 R |
| 7,073,753 B2 * | 7/2006 | Root et al. | ............... | 246/72 |
| 7,177,732 B2 * | 2/2007 | Kraeling et al. | ............... | 701/19 |
| 7,222,003 B2 * | 5/2007 | Stull et al. | ............... | 701/19 |
| 7,302,895 B2 * | 12/2007 | Kumar et al. | ............... | 105/26.05 |

(Continued)

FOREIGN PATENT DOCUMENTS
EP 1 253 059 10/2002

*Primary Examiner* — Thomas Black
*Assistant Examiner* — Wae Louie
(74) *Attorney, Agent, or Firm* — GE Global Patent Operation; John A. Kramer

(57) ABSTRACT

In a locomotive consist having at least a lead locomotive and a remote locomotive with a distributed power system on each locomotive in the locomotive consist, a system for establishing distributed power operations of the locomotive consist from a single location, the system including a communication network providing communications to and from at least one distributed power system, and a distributed power setup unit in communication with the distributed power system by way of the communication network. The distributed power setup unit has at least one of a processor, display and an input device to allow a user to establish distributed power operations.

19 Claims, 2 Drawing Sheets

U.S. PATENT DOCUMENTS

| | | | |
|---|---|---|---|
| 7,309,929 B2 * | 12/2007 | Donnelly et al. | 290/4 R |
| 7,388,483 B2 * | 6/2008 | Welles et al. | 340/539.22 |
| 7,395,141 B1 * | 7/2008 | Seck et al. | 701/19 |
| 7,428,453 B2 * | 9/2008 | Davenport et al. | 701/19 |
| 7,447,571 B2 * | 11/2008 | Nickles et al. | 701/20 |
| 7,522,990 B2 * | 4/2009 | Daum et al. | 701/123 |
| 7,590,485 B2 * | 9/2009 | Daum et al. | 701/123 |
| 7,618,011 B2 * | 11/2009 | Oleski et al. | 246/167 R |
| 7,650,207 B2 * | 1/2010 | Metzger | 701/19 |
| 7,715,956 B2 * | 5/2010 | Bryant | 701/19 |
| 2002/0072833 A1 | 6/2002 | Gray | |
| 2003/0034423 A1 | 2/2003 | Hess, Jr. et al. | |
| 2003/0120400 A1 | 6/2003 | Ahmed Baig et al. | |
| 2003/0183729 A1 | 10/2003 | Root et al. | |
| 2007/0241237 A1 * | 10/2007 | Foy et al. | 246/167 R |

* cited by examiner

METHOD, SYSTEM, AND COMPUTER SOFTWARE CODE FOR AUTOMATED ESTABLISHMENT OF A DISTRIBUTED POWER TRAIN

This application claims priority based on U.S. Provisional Application No. 60/792,428 filed Apr. 17, 2006, which is incorporated herein by reference.

FIELD OF THE INVENTION

The field of invention relates to distributed power operations of a train, and, more particularly, to a method, system, and computer software code for remotely setting up, linking and testing distributed power operations of a train.

BACKGROUND OF THE INVENTION

Trains with distributed power systems can be operated in different modes. One mode is where all locomotives in the train operate at the same notch command. For example, if a lead locomotive is commanding motoring at notch 8, N8, all units in the train will be commanded to generate motoring at N8 power. Another mode of operation is "independent" control. In this mode, locomotives or sets of locomotives distributed throughout the train can be operated at different motoring or braking powers. For example, as a train crests a mountaintop, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives.

When operating in distributed power, an operator, usually located in the lead locomotive, can control operating functions of remote locomotives in the remote consists via a control system, such as a distributed power control element. Thus when operating in distributed power, the operator can command each locomotive consist to operate at a different notch power level (or one consist could be in motoring and other could be in braking), or each individual locomotive in the locomotive consist operates at the same notch power.

Currently, a train having locomotives that may operate in distributed power are set up manually, usually at a rail yard. Operators must physically enter each locomotive to enter data into the distributed power system aboard the locomotive to enable "linking" of the locomotives so that distributed power operations may commence. For example, suppose locomotives are included in a train where the locomotives may be facing different directions, meaning that some may be facing forward whereas others may be facing backward. The operator must physically enter each locomotive and select the direction the locomotive should motor. The operator must also initiate and attempt to complete the linking process prior to any unforeseen problems with equipment or systems in the train being detected. Train operators and owners may realize a financial savings and reduction in manpower from remotely setting up, linking and testing distributed power operations of a train.

BRIEF DESCRIPTION OF THE INVENTION

Exemplary embodiments of the invention are directed towards a system, method, and a computer software code for remotely establishing distributed power operations of a train. Towards this end, a system for establishing distributed power operations of a locomotive consist from a single location in a locomotive consist that has a lead locomotive and/or a remote locomotive with a distributed power system on each locomotive in the locomotive consist is disclosed. The system includes a communication network providing communications to and from at least one distributed power system, and a distributed power setup unit in communication with the distributed power system by way of the communication network. The distributed power setup unit has a processor, display, and/or an input device to allow a user to establish distributed power operations.

In another exemplary embodiment a method is disclosed. The method is for autonomously establishing distributed power operations of a locomotive consist from a single location where the locomotive consist has a lead locomotive and/ or a remote locomotive with a distributed power system on each locomotive. On step in the method include receiving data remotely from a distributed power system on a locomotive specific to the locomotive. Another involves sending data remotely to the distributed power system on the locomotive pertaining to distributed power settings to configure the locomotive for distributed power operations. Another provides for confirming the locomotive is configured for distributed power operations.

In yet another exemplary embodiment, a computer software code is disclosed. The computer software code is for autonomously establishing distributed power operations of the locomotive consist from a single location that has a processor. The locomotive consist has a lead locomotive and/or a remote locomotive with a distributed power system on each locomotive and a processor connected to each distributed power system. The computer software code includes a computer software module for receiving data remotely from a distributed power system on a locomotive specific to the locomotive; A computer software module is also provided for sending data remotely to the processor connected to the distributed power system on the locomotive pertaining to distributed power settings to configure the locomotive for distributed power operations. Also included is a computer software module for confirming the locomotive is configured for distributed power operations.

BRIEF DESCRIPTION OF THE DRAWINGS

A more particular description of exemplary embodiments of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which.

DETAILED DESCRIPTION OF THE INVENTION

Figure 1:
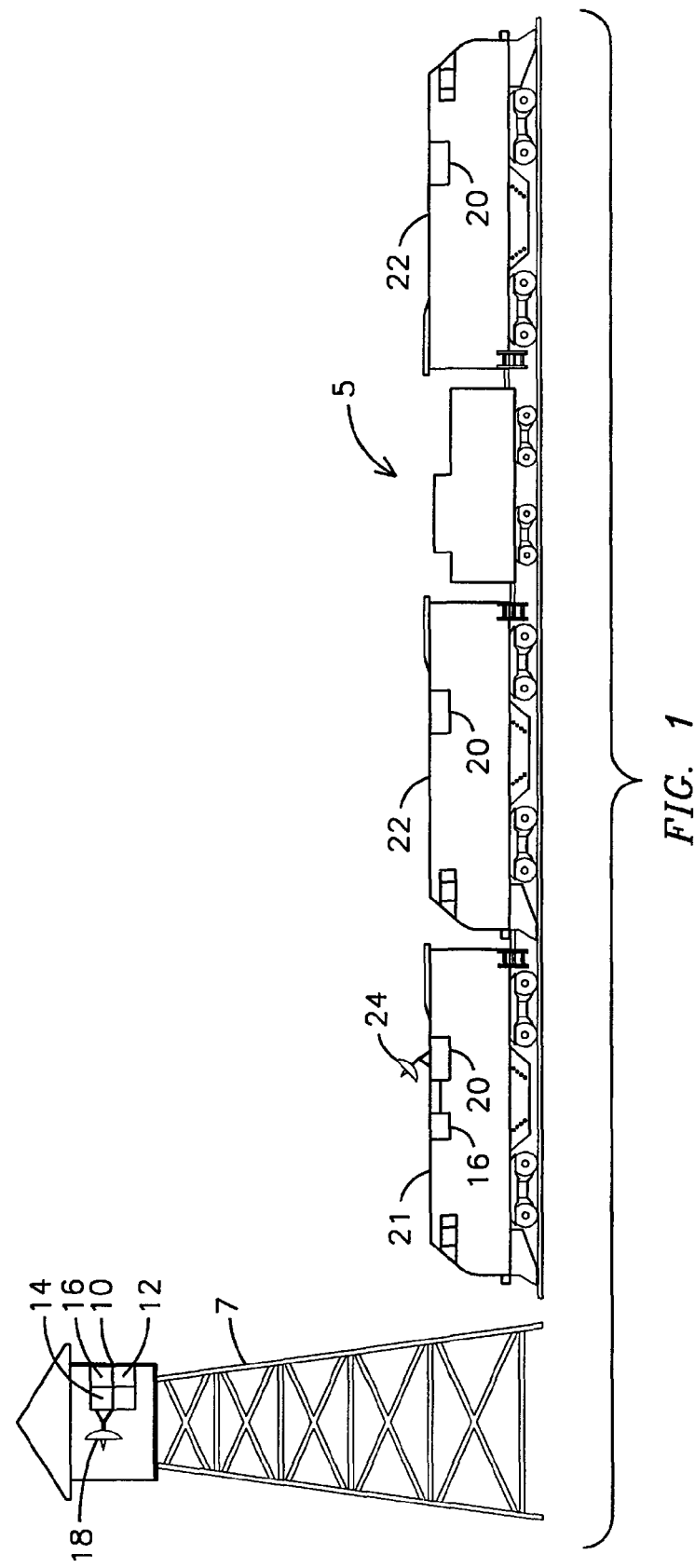
FIG. 1 depicts an exemplary embodiment of a system for remotely setting up, linking and testing distributed power operations of a train.

Reference will now be made in detail to exemplary embodiments consistent with the invention, examples of which are illustrated in the accompanying drawings. Wherever possible, the same reference numerals used throughout the drawings refer to the same or like parts.

Exemplary embodiments of the invention solve the problems in the art by providing a system, method, and computer software code for determining and implementing an automated set-up of a distributed power train. Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the exemplary embodiments of the invention.

Broadly speaking, the technical effect provides for a method, system, and computer software code for automated set-up of a distributed power train. To facilitate an understanding of the exemplary embodiments of the invention, it is described hereinafter with reference to specific implementations thereof. Exemplary embodiments of the invention may use program modules that may include routines, programs, objects, components, data structures, etc. that perform particular tasks or implement particular abstract data types. For example, the software programs that underlie exemplary embodiments of the invention may be coded in different languages for use with different platforms.

Though exemplary embodiments of the invention are disclosed below as operating with hand-held devices, those skilled in the art will appreciate that exemplary embodiments of the invention may be practiced with other computer system configurations, including multiprocessor systems, microprocessor-based or programmable consumer electronics, minicomputers, mainframe computers, and the like. Exemplary embodiments of the invention may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in consist, or off-board in wayside or central offices where wireless communication is used.

Throughout this document the term locomotive consist is used. As used herein, a locomotive consist may be described as having one or more locomotives in succession, connected together so as to provide motoring and/or braking capability. The locomotives are connected together where no train cars are in between the locomotives. The train can have more than one consist in its composition. Specifically, there can be a lead consist, and more than one remote consists, such as midway in a line of cars and another remote consist at the end of the train. Each locomotive consist may have a first locomotive and trail locomotive(s). Though a locomotive consist is usually viewed as successive locomotives, those skilled in the art will readily recognize that a consist group of locomotives may also be recognized as a locomotive consist even when at least a car separates the locomotives, such as when the locomotive consist is configured for distributed power operation, wherein throttle and braking commands are relayed from the lead locomotive to the remote trains by a radio link or physical cable. Towards this end, the term locomotive consist should be not be considered a limiting factor when discussing multiple locomotives within the same train.

Referring now to the drawings, exemplary embodiments of the invention will be described. FIG. 1 depicts an exemplary embodiment of a system for remotely setting up, linking and testing distributed power operations of a train. At a location, or remote location, such as away from a locomotive consist 5, such as in a tower 7, a distributed power setup unit 10 is provided for an operator to use. In another exemplary embodiment, an operator aboard a train, such as located in the lead locomotive 21 of the locomotive consist 5, may use the setup unit 10 to remotely setup the remote locomotives 22 in the locomotive consist 5 for distributed power operations.

Figure 2:
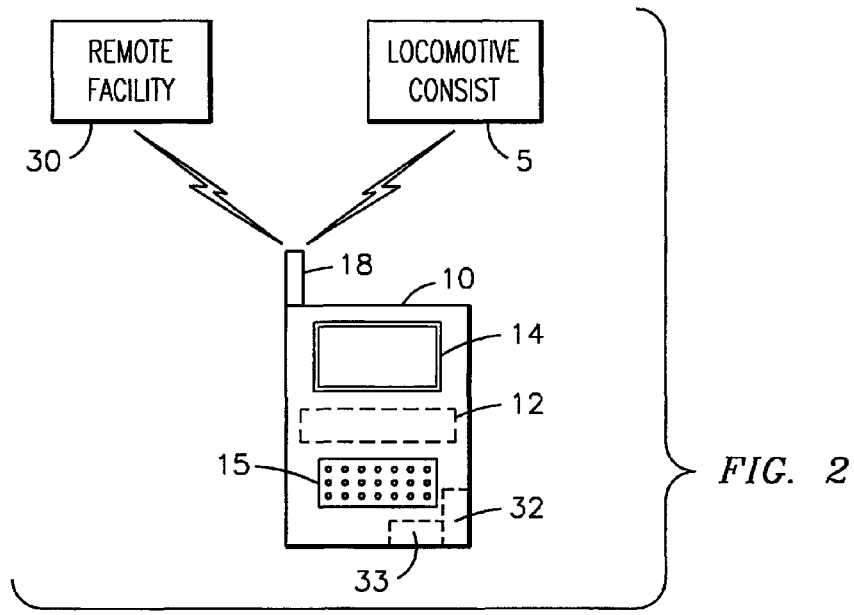
FIG. 2 depicts an exemplary embodiment of a setup unit.

FIG. 2 depicts an exemplary embodiment of a setup unit. The setup unit 10 has a computer, or processor, 12 with a display 14 and operator input device 15, such as but not limited to a mouse and/or a keyboard. As disclosed herein, the setup unit 10 may be a hand-held device. A first communication interface 18 is also connected to the setup unit 10. As further illustrated in FIG. 1, the first communication interface 18 is able to communicate with the distributed power system 20 on the locomotives 21, 22.

At the locomotive consist 5, a second communication interface 24 is provided to receive and send communications between itself and the first communication interface 18 at the setup unit 10. Towards this end, the first communication interface 18 at the setup unit 10 is in communication with the distributed power system 20 wherein it can receive information from the distributed power system 20 and send commands to the distributed power system 20. Examples of the distributed power system include, but are not limited to Assignee's LOCOTROL® Locomotive System Integration (LSI) Electronics, or System, and/or other systems/equipment that functions with the LSI system.

In an exemplary use of the invention, an operator may use the setup unit 10 to input such information as, but not limited to, road numbers of the lead locomotive 21 and all remote locomotives 22 within the locomotive consist 5 to be linked, the orientation of each locomotive 21, 22 within the locomotive consist 5 (i.e., whether the locomotive's short hood or long hood is forward). By doing so, the locomotives will know which direction is forward since the locomotives 21, 22 may have either its respective short hood or long hood facing the direction the train shall motor.

The setup unit 10 may transmit this information to each distributed locomotive 21, 22 in the locomotive consist 5, or to the lead locomotive 21 which in turn would communicate with the remote locomotives 22. In one embodiment, the on-board distributed system 20 would only accept such data when the locomotives 21, 22 are not already linked. In another embodiment, the operator may override a prior link of the locomotives 21, 22 with new information.

The on-board distributed system 20 may accept the data and proceed with linking the locomotives 21, 22. The linking process could continue through completion of a train leakage test that confirms proper linking of the locomotives. The complete linking process could be completed without human intervention aboard any of the locomotives 21, 22 and prior to operators physically entering the train.

For example, with the LOCOTROL® LSI system, in an exemplary embodiment, information that may be provided on a display of the LSI system is also provided on a display on the setup unit 10. Based on how the LSI system functions, the remote locomotives in a locomotive consist are set up first.

The lead locomotive 21 of the locomotive consist 5 is only set after all setups for the remote locomotives 22 are completed. The distributed power operations can also be shutdown using the exemplary embodiment of the invention. As discussed in more detail below with respects to FIG. 3, the lead distributed power locomotive 21 may report a status back to the setup unit 10, either confirming the linking process was successful or reporting a failure and identifying what step in the process detected the failure along with any information, or data, as to what could have caused the failure.

As further illustrated in FIG. 2, the setup unit may be accessible by other remote locations 30, such as a dispatch location and/or a repair depot. This remote location will know when the locomotive consist 5 is properly linked. If the linking process is not completed due to a failure, this information can also be forwarded.

In an exemplary embodiment connections between the setup unit 10 and the distributed power system 20 may be via radio and/or any other form of wireless communication. In another exemplary embodiment communication may take place via a wired connection. Communications between the setup unit 10 and the remote facility 7 may be via wireless communications and/or wired communications. For example, communications may occur using the Internet where dial-in-connections, cable modems, special high-speed IDSN lines, networks such as local area networks, wide area networks, etc. may be utilized. Furthermore when the setup unit 10 is used aboard the locomotive consist, such aboard the lead locomotive 21, the unit may be directly interfaced into the distributed power system 20 aboard the lead locomotive 21.

In addition to the parts of the setup unit 10 disclosed above, the setup unit 10 may also have a mass storage device 32 and memory 33. Towards this end, in addition to performing the functions disclosed above, the setup unit 10 may also store information regarding linking processes completed wherein data about prior linking processes may be later communicated to a remote facility.

Figure 3:
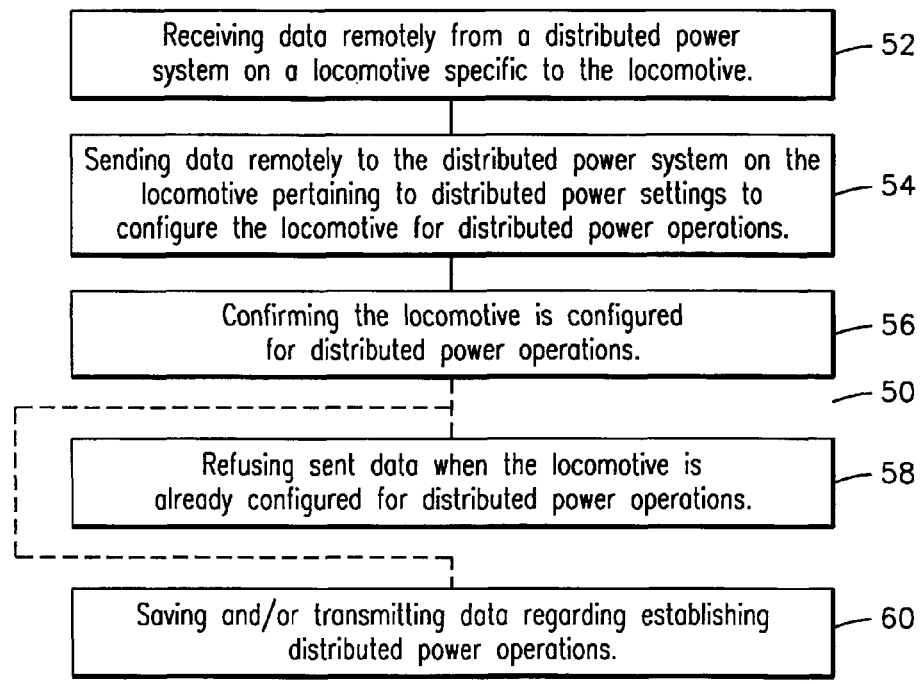
FIG. 3 depicts an exemplary embodiment of a flowchart of a method for remotely setting up, linking and testing distributed power operations of a train.

FIG. 3 depicts an exemplary embodiment of a flowchart of a method for remotely setting up, linking and testing distributed power operations of a train. As discussed above and illustrated in the flowchart 50, one step includes receiving data remotely from a distributed power system on a locomotive specific to the locomotive, step 52. The data is sent remotely to the distributed power system on the locomotive pertaining to distributed power settings to configure the locomotive for distributed power operations, step 54. A confirmation is made as to whether the locomotive is configured for distributed power operations, step 56. As discussed above, if the locomotive 21, 22 is already configured for distributed power operations the method may refused sent data, step 58. Additionally, data may be saved and/or transmitted regarding the establishment, or inability to establish distributed power operations, step 60. As discussed above, the data may be sent back to the setup unit 10. If a failure occurs the data may include, but is not limited to, what step in the process detected the failure including data as to what could have caused the failure.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A system for initiating distributed power operations of a rail vehicle consist, the system comprising:
a distributed power setup unit configured to communicate with a distributed power system on-board the rail vehicle consist, the distributed power system operably coupled with a communication interface on board the rail vehicle consist for controlling distributed power operations of a lead locomotive and a remote locomotive of the rail vehicle consist, the communication interface for communicating between the lead locomotive and the remote locomotive;
wherein the distributed power setup unit is further configured to generate signals for automatically and remotely establishing distributed power operations of the distributed power system between the lead locomotive and the remote locomotive.

2. The system of claim 1 wherein the distributed power setup unit is located at a location on the rail vehicle consist or a location remote from the rail vehicle consist.

3. The system of claim 1 further comprising an operator input device, and wherein a type of information is inputted to the operator input device and communicated between the distributed power setup unit and the distributed power system, said information being at least one of locomotive orientation or road numbers of each locomotive.

4. The system of claim 3 wherein the operator input device is a hand-held device.

5. The system of claim 1 wherein the distributed power setup unit is only in communication with the distributed power system on the lead locomotive.

6. The system of claim 5 wherein the distributed power system is located on each of the lead locomotive and the remote locomotive, and the lead locomotive is in communication with the distributed power system on the remote locomotive and relays commands from the distributed power setup unit to the distributed power system on the remote locomotive.

7. The system of claim 1 further comprising a processor connected to the distributed power system to process commands from the distributed power setup unit.

8. The system of claim 1 wherein the distributed power setup unit further comprises a mass storage device and memory to retain information regarding establishing distributed power operations.

9. The system of claim 1 wherein upon establishing distributed power operations, the lead locomotive and the remote locomotive operate at the same notch power level.

10. The system of claim 1 wherein the distributed power system on the lead locomotive is configured to transmit a status signal to the distributed power setup unit after the establishing of the distributed power operations for the at least one of the lead locomotive or the remote locomotive, said status signal to confirm that the establishing of the distributed power operations for the at least one of the lead locomotive or the remote locomotive was successful or to report that the establishing of distributed power operations for the at least one of the lead locomotive or the remote locomotive was not successful.

11. The system of claim 1 wherein the distributed power setup unit is positioned on the rail vehicle consist, and is in communication with a remote facility, to communicate a status of the establishing of the distributed power operations between the at least one of the lead locomotive or the remote locomotive to the remote facility.

12. A system for initiating distributed power operations of a rail vehicle consist, the system comprising:
- a communication interface on board the rail vehicle consist configured to communicate between a lead locomotive and at least one remote locomotive of the rail vehicle consist, wherein the lead locomotive and the at least one remote locomotive are spaced apart by at least one non-locomotive rail car;
- a distributed power system on-board the rail vehicle consist and operably coupled with the communication interface for controlling distributed power operations of the lead locomotive and the at least one remote locomotive; and
- a distributed power setup unit on-board the lead locomotive and in communication with the distributed power system, the distributed power setup unit configured to automatically and remotely establish distributed power operations of the distributed power system between the lead locomotive and the at least one remote locomotive.

13. The system of claim 12 further comprising an operator input device, and wherein a type of information is inputted to the operator input device and communicated between the distributed power setup unit and the distributed power system, said information being at least one of locomotive orientation or road numbers of each locomotive.

14. The system of claim 12 wherein the distributed power setup unit is only in communication with the distributed power system on the lead locomotive.

15. The system of claim 12 wherein the distributed power system is located on each of the lead locomotive and the at least one remote locomotive, and the lead locomotive is in communication with the distributed power system on the at least one remote locomotive and relays commands from the distributed power setup unit to the distributed power system on the at least one remote locomotive.

16. The system of claim 12 further comprising a processor connected to the distributed power system to process commands from the distributed power setup unit.

17. The system of claim 12 wherein the distributed power setup unit further comprises a mass storage device and memory to retain information regarding establishing distributed power operations.

18. The system of claim 12 wherein the distributed power system on the lead locomotive is configured to transmit a status signal to the distributed power setup unit after the establishing of the distributed power operations for the at least one of the lead locomotive or the at least one remote locomotive, said status signal to confirm that the establishing of the distributed power operations for the at least one of the lead locomotive or the at least one remote locomotive was successful or to report that the establishing of distributed power operations for the at least one of the lead locomotive or the at least one remote locomotive was not successful.

19. The system of claim 12 wherein the distributed power setup unit is configured to communicate a status of the establishing of the distributed power operations between the at least one of the lead locomotive or the at least one remote locomotive to a remote facility.

* * * * *